(12) United States Patent
Kusukame et al.

(10) Patent No.: US 8,767,783 B2
(45) Date of Patent: Jul. 1, 2014

(54) LIGHT SOURCE DEVICE, LIGHTING DEVICE AND IMAGE DISPLAY DEVICE

(75) Inventors: Koichi Kusukame, Osaka (JP); Tetsuro Mizushima, Hyogo (JP); Kazuhisa Yamamoto, Osaka (JP); Hiroyuki Furuya, Osaka (JP); Shinichi Kadowaki, Hyogo (JP); Kiminori Mizuuchi, Ehime (JP)

(73) Assignee: Panasonic Corporation, Osaka (JP)

( * ) Notice: Subject to any disclaimer, the term of this patent is extended or adjusted under 35 U.S.C. 154(b) by 629 days.

(21) Appl. No.: 12/596,577

(22) PCT Filed: Feb. 18, 2009

(86) PCT No.: PCT/JP2009/000677
§ 371 (c)(1),
(2), (4) Date: Oct. 19, 2009

(87) PCT Pub. No.: WO2009/104392
PCT Pub. Date: Aug. 27, 2009

(65) Prior Publication Data
US 2010/0118535 A1     May 13, 2010

(30) Foreign Application Priority Data
Feb. 20, 2008  (JP) .................. 2008-038241

(51) Int. Cl.
*H01S 3/10*     (2006.01)
(52) U.S. Cl.
USPC .......... 372/26; 359/288; 372/27; 372/28; 372/29.02; 372/29.023; 372/31; 372/32
(58) Field of Classification Search
USPC ......... 372/26, 27, 28, 29.02, 29.023, 31, 32; 359/288, 289
See application file for complete search history.

(56) References Cited

U.S. PATENT DOCUMENTS

| | | | | |
|---|---|---|---|---|
| 3,434,779 A | * | 3/1969 | Leite et al. | 359/241 |
| 4,880,296 A | * | 11/1989 | Ditman, Jr. | 359/299 |
| 4,886,331 A | * | 12/1989 | Peterson | 385/16 |
| 5,121,246 A | * | 6/1992 | Lasher et al. | 359/288 |

(Continued)

FOREIGN PATENT DOCUMENTS

| | | |
|---|---|---|
| CN | 1894624 | 1/2007 |
| JP | 11-337888 | 12/1999 |

(Continued)

OTHER PUBLICATIONS

International Search Report issued Mar. 24, 2009 in International (PCT) Application No. PCT/JP2009/000677.

*Primary Examiner* — Julio J Moldonado
*Assistant Examiner* — Joshua King
(74) *Attorney, Agent, or Firm* — Wenderoth, Lind & Ponack, L.L.P.

(57) ABSTRACT

A light source device is provided with a coherent light source for emitting the coherent light, and a pattern changer for changing an interference pattern of the coherent light on a surface of the illumination object. The pattern changer includes a photorefractive crystal which is arranged between the coherent light source and the illumination object and on an optical path of the coherent light and exhibits a photorefractive effect, and a changer for changing at least one of a light intensity distribution, a polarization direction, a wavelength and an intensity of coherent light incident on the photorefractive crystal. The illumination object is illuminated with the coherent light.

3 Claims, 11 Drawing Sheets

(56) References Cited

U.S. PATENT DOCUMENTS

| | | | | |
|---|---|---|---|---|
| 5,363,221 | A | * | 11/1994 | Sutton et al. .................... 359/11 |
| 5,561,547 | A | * | 10/1996 | Keirstead et al. ............. 359/288 |
| 6,359,150 | B1 | | 3/2002 | Fukudome et al. |
| 2003/0077038 | A1 | | 4/2003 | Murashima et al. |
| 2007/0153235 | A1 | | 7/2007 | Morikawa et al. |
| 2008/0170285 | A1 | | 7/2008 | Kasazumi et al. |

FOREIGN PATENT DOCUMENTS

| | | |
|---|---|---|
| JP | 2001-48875 | 2/2001 |
| JP | 2003-149612 | 5/2003 |
| JP | 2004-144936 | 5/2004 |
| JP | 2007-233371 | 9/2007 |
| WO | 2005/083492 | 9/2005 |
| WO | WO 2007099979 A1 * 9/2007 | ................ G02F 1/01 |

* cited by examiner

LIGHT SOURCE DEVICE, LIGHTING DEVICE AND IMAGE DISPLAY DEVICE

FIELD OF THE INVENTION

The present invention relates to a light source device, a lighting device and an image display device using coherent light such as laser light.

DESCRIPTION OF THE BACKGROUND ART

Coherent light sources (light sources for producing coherent light) such as laser light sources are used in image display devices, measuring instruments, exposure lithographic devices used for producing a circuit on a semiconductor substrate and the like. As compared with lamp light sources used in projectors and the like, laser light sources using lasers can more easily increase light utilization efficiency since having longer lives, higher emission efficiencies and stronger directionalities. In the case of being used in an image display device, a laser light source can display a sharp image with a large color reproduction region since being monochromatic.

On the other hand, speckle noise is produced in image display devices, measuring instruments, exposure devices and lighting devices using laser light sources as light sources. For example, when an observer views a virtual image formed by an image display device, rays of light from the respective regions of a screen overlap on the retinas of the observer to form an image. At this time, since the rays of light by way of different regions overlap on this screen in a complicated positional relationship and laser light has high coherency, the rays of light interfere with each other. Since an interference pattern is formed by such interference, it reduces the quality of a displayed image as an unintended light intensity distribution (speckle noise). Similarly, in the case of using a laser light source as a light source for a measuring instrument or an exposure device, light intensity becomes uneven on a target surface due to the coherency of laser light.

The above speckle noise is a common problem in the case of using coherent laser light as a light source for an image display device, a measuring instrument, an exposure device or the like, and various attempts have been made thus far to reduce the speckle noise.

For example, constructions using a rotating diffuser have been proposed as disclosed in patent literatures 1, 2. In these constructions, a diffuser is arranged on an optical path of laser light emitted from a light source and rotated at a high speed, and the laser light passes through the diffuser. An interference pattern produced by the laser light that is coherent light is disrupted by rotating this diffuser at a high speed, and this interference pattern is averaged by being moved around at a high speed on the screen, whereby the speckle noise is reduced.

In other words, in these constructions, the interference pattern does not actually disappear, but it looks as if the speckle noise had disappeared by superimposing a plurality of different (having no correlation with each other) interference patterns.

However, since these constructions require a large mechanical rotating mechanism, a vibrating mechanism whose amplitude exceeds 100 μm, and the like in these constructions, noise is produced. Further, since large power is consumed for driving, power consumption of the entire device increases.

[Patent Literature 1]

Japanese Unexamined Patent Publication No. 2007-233371

[Patent Literature 2]

Japanese Unexamined Patent Publication No. 2004-144936

SUMMARY OF THE DISCLOSURE

An object of the present invention is to provide a light source device which has low levels of noise and power consumption and can continuously reduce speckle noise by temporally changing an interference pattern on an irradiated surface.

One aspect of the present invention is directed to a light source device for illuminating an illumination object with coherent light, comprising a coherent light source for emitting the coherent light; and a pattern changer for changing an interference pattern of the coherent light on a surface of the illumination object, wherein the pattern changer includes a photorefractive crystal which is arranged between the coherent light source and the illumination object and on an optical path of the coherent light and exhibits a photorefractive effect, and a changer for changing at least one of a light intensity distribution, a polarization direction, a wavelength and an intensity of coherent light incident on the photorefractive crystal.

In the above light source device, noise and power consumption can be low and speckle noise can be continuously reduced by temporally changing an interference pattern on an irradiated surface.

DETAILED DESCRIPTION OF THE INEVENTION

Figure 1:
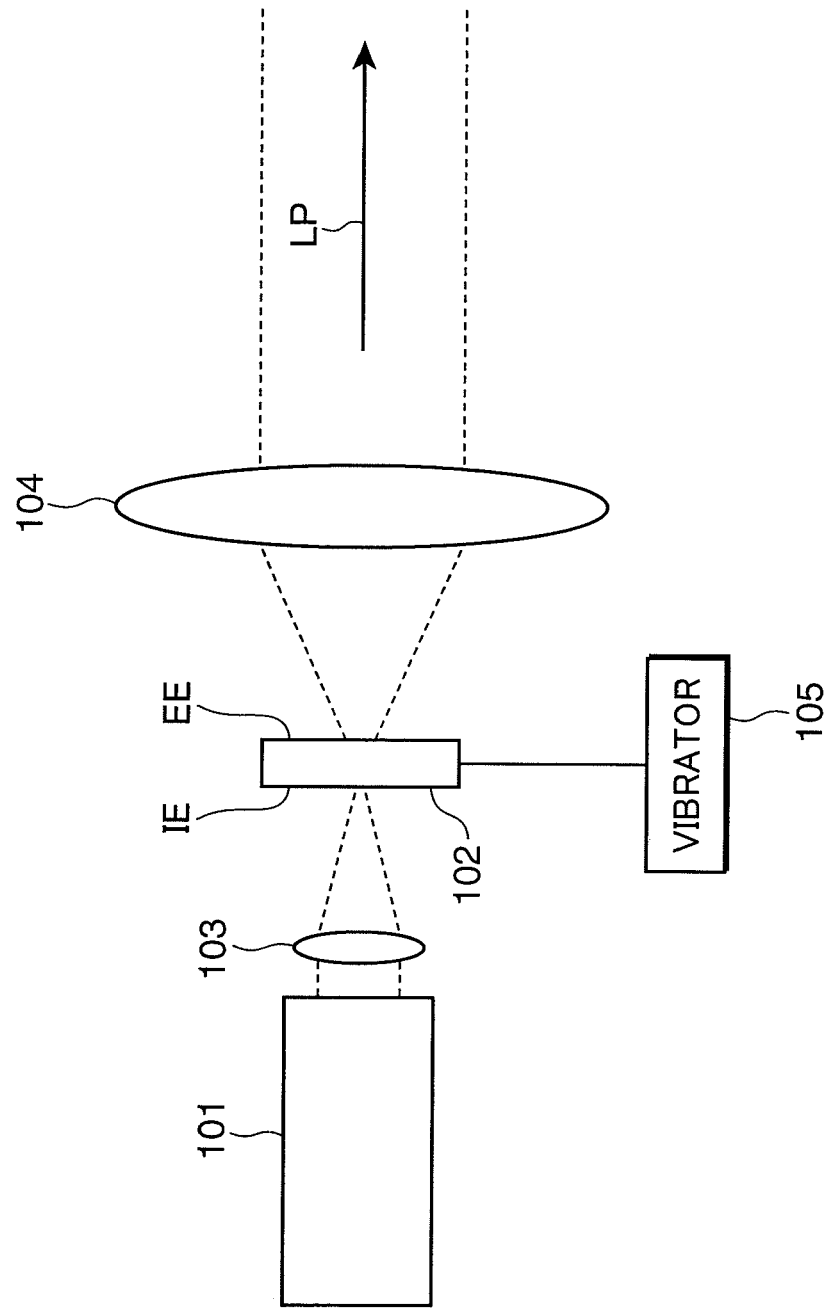
FIG. 1 is a conceptual diagram showing an exemplary construction of a light source device according to a first embodiment of the invention.

By using a changer for changing the polarization of coherent light using a crystal which exhibits an acoustooptic effect and an electro-optic effect such as a Kerr effect or a Pockels effect, an interference pattern of coherent light on an irradiated surface can be changed. This enables speckle noise to be reduced without requiring a large rotating mechanism and a vibrating mechanism which bring about noise and power consumption increases as conventional problems.

However, in the case of using these, a source for generating high voltages or ultrasonic waves is necessary. Thus, it is more preferable to use such a changer for changing the interference pattern of coherent light on the irradiated surface by changing at least one of a light intensity distribution, an intensity (e.g. maximum intensity or average intensity), a polarization direction and a wavelength of the coherent light incident on the crystal. For example, the incident position of the coherent light may be changed or the light intensity distribution of the coherent light itself may be changed as a method for changing the light intensity distribution. Alternatively, the output, polarization direction or wavelength of the incident coherent light itself may be changed.

Here, a changer using a crystal which exhibits a thermal lens effect for changing lens power according to the intensity of incident light or a photorefractive (hereinafter, "PR") effect for producing a refractive index distribution according to a spatial light intensity distribution of incident light can be used as the changer for changing the interference pattern of the coherent light by changing the light intensity distribution, intensity, polarization direction or wavelength of the coherent light incident on the crystal.

By using the above changer utilizing the thermal lens effect or the PR effect, the interference pattern formed on the irradiated surface is changed at a high speed to reduce speckle noise. Further, the use of the above changer utilizing the thermal lens effect or the PR effect makes it unnecessary to use a source for generating high voltages or ultrasonic waves which are necessary in the case of using the electro-optic effect or the acoustooptic effect. Further, a rotating mechanism and a large vibrating mechanism which bring about noise and power consumption increases as conventional problems become unnecessary, whereby speckle noise can be reduced.

Particularly, the PR effect can produce a large refractive index change even for light with low power, and it is more preferable to use the PR effect since a speckle noise reducing effect is larger as compared with the case of using the thermal lens effect in an image display device, a measuring instrument, an exposure device and a lighting device using a laser light source with a low output of about several tens of mW.

Hereinafter, embodiments of the present invention utilizing the above PR effect and thermal lens effect are described with reference to the drawings.

(First Embodiment)

In this embodiment is illustrated a light source device which is commonly used in an image display device, a measuring device, an exposure device, a lighting device and the like and can reduce speckle noise which is problematic in these devices.

FIG. 1 is a conceptual diagram showing an exemplary construction of a light source device according to a first embodiment of the present invention. This light source device includes at least a laser light source 101 and a PR crystal 102 and, further includes a condenser lens 103, a field lens 104 and a vibrator 105 according to needs. After being condensed by the condenser lens 103, laser light (coherent light) emitted from the laser light source 101 is incident on the PR crystal 102 made of a material which exhibits a PR effect and a refractive index change of the laser light is induced by the PR effect of the PR crystal 102. By this refractive index change, an interference pattern of the laser light on an irradiated surface is changed to reduce speckle noise.

Here, the above effect is exhibited in this embodiment as long as the PR crystal 102 that exhibits the PR effect for the wavelength of a laser is used regardless of a laser used as the laser light source 101 such as a semiconductor laser, a solid-state laser and a fiber laser.

However, if light having fixed intensity, wavelength, polarization direction and light intensity distribution is continuously incident on the same position of the PR crystal, an amount of the refractive index change in the PR crystal decreases with time and consequently the refractive index no longer changes. Hence, the inventors of the present application were dedicated to study the decrease in the amount of the refractive index change, with the result that they found it possible to recover the amount of the refractive index change in the PR crystal by changing at least one of the intensity, wavelength, polarization direction and light intensity distribution of light incident on the PR crystal. This point similarly holds for a thermal lens crystal to be described later and the like.

Here, if it is assumed that a period until the amount of the refractive index change decreases to or below 10% of an initial change amount is a PR saturation period, it is preferable to change at least one of the intensity, wavelength, polarization direction and light intensity distribution of light incident on the PR crystal in a cycle shorter than the PR saturation period. In this way, an effect of sufficiently reducing the speckle noise can be continuously obtained without requiring a rotating mechanism and a large vibrating mechanism which bring about noise and power consumption increases as conventional problems.

The PR effect induces a faster refractive index change to provide a larger speckle noise reducing effect as the intensity of the coherent light incident on the PR crystal is higher. However, since the PR saturation period is shortened by that much, it is preferable to adjust the intensity of the coherent light incident on the PR crystal depending on the application.

Further, as an interaction distance of the PR crystal and the coherent light (distance from the incidence surface to the emergence surface of the PR crystal) is longer, the PR saturation period is longer and, simultaneously, the speckle noise reducing effect is larger.

Since PR crystals differ in the wavelength of laser light at which the PR effect is exhibited, the refractive index change amount by the PR effect and the response speed, it is preferable to select an optimal PR crystal which can obtain an effect of sufficiently reducing the speckle noise depending on the application (incident laser output, wavelength, light intensity distribution, necessary response speed, etc.). Exemplary PR crystals suitably used as the PR crystal 102 are specifically described below.

First of all, ferroelectric substances such as $LiNbO_3$ and $LiTaO_3$ are PR crystals which exhibit the PR effect for light from a visible region to an ultraviolet region and produce a very large refractive index change. $LiNbO_3$ is much more inexpensive than other PR crystals and particularly preferable in the case of being used in the image display device. Further, by doping $LiNbO_3$ with Fe or Mn ions, $LiNbO_3$ exhibits a faster PR effect. Thus, the speckle noise reducing effect can be improved as compared with the case where Fe or Mn ions are not doped.

Here, in the case of doping $LiNbO_3$ with Fe, the amount of the refractive index change increases, but the PR saturation period becomes shorter as doping concentration increases, whereas the amount of the refractive index change decreases, but the PR saturation period becomes longer as doping concentration decreases. For example, if the PR saturation period decreases 0.1 μs or shorter, it is necessary to change the intensity, wavelength, polarization direction and light intensity distribution of the laser light incident on the PR crystal at a frequency equal to or higher than 10 MHz, wherefore a complicated construction is necessary for modulation.

Thus, the doping concentration of Fe is preferably below 0.1%. In this case, since the PR saturation period exceeds 1 μs, the changer for changing the intensity, wavelength, polarization direction or light intensity distribution of the laser light incident on the PR crystal can be realized by a simple construction. Further, the doping concentration of Fe is preferably 0.002% or higher, more preferably 0.004% or higher, which enables a refractive index change amount capable of reducing speckle noise in a liquid crystal display to be obtained. Further, the doping concentration of Fe is preferably 0.01% or higher, which enables a sufficient refractive index change amount to be obtained also in a projection-type image display device in which it is difficult to reduce speckle noise.

If it is assumed that X % is the doping concentration of Fe, an effect of even more reducing the speckle noise can be obtained by setting the intensity of the incident laser light to $-0.1922 \cdot \ln(X) - 0.1963$ (W/cm$^2$) or higher. However, it is preferable to set the intensity of the laser light below 23 MW/cm$^2$, which makes it possible to suppress the deterioration of the PR effect of $LiNbO_3$ with time and realize a long life of 20000 hours or longer. It is more preferable to set the intensity of the laser light below 11 MW/cm$^2$, which enables a long life of 60000 hours or longer.

Next, organic materials such as PVK:DMNPAA:ECZ: TNF, PVK:TNF:DMNPAA:BisCzPR are PR crystals which can be inexpensively and easily formed, exhibit the PR effect for light in a red wavelength region, and have large refractive index change amounts. Thus, they enable a larger speckle noise reducing effect to be obtained. The PR crystal made of the above organic material has a PR saturation period in the order of ms, can realize a changer for changing the intensity, wavelength, polarization direction or light intensity distribution of laser light incident on the PR crystal at a frequency in the order of kHz by a simple construction, and can maintain the speckle noise reducing effect.

Further, in the case of using the PR crystal made of the above organic material, the intensity of the incident laser light is preferably 1.2 W/cm$^2$ or higher at least on a part of the incident surface. In this case, the speckle noise reducing effect is further increased to obtain a refractive index change amount capable of reducing speckle noise in a liquid crystal display. The intensity of the incident laser light is more preferably 3.1 W/cm$^2$ or higher at least on a part of the incident surface, which enables a refractive index change amount capable of reducing the speckle noise to be obtained even in a projection-type image display device in which it is difficult to reduce speckle noise. In order to suppress a reduction of the PR effect caused by deterioration with time, the intensity of the incident laser light is preferably below 200 kW/cm$^2$.

Next, compound semiconductors such as GaAs, GaP, GaN and InP and sillenite-type crystals such as $Bi_{12}SiO_{20}$ (BSO), $Bi_{12}TiO_{20}$ (BTO) are also PR crystals which exhibit the PR effect for visible light, have very fast response speeds lying in a range from the order of ms to the order of μs although having smaller amounts of produced refractive index changes as compared with $LiNbO_3$ crystals. Therefore, the speckle noise reducing effect is large particularly in the case of being used as a light source of a measuring instrument or an exposure device.

It is preferable that an incident end IE (incident surface) and an emergent end EE (an opposite surface) of the PR crystal 102 are optically polished so that reflectance of the incident laser light at the incident end IE and the emergent end EE is 2% or lower and that anti-reflection films are formed on the incident end IE and the emergent end EE. In this way, light utilization efficiency can be improved.

However, it is preferable that a part of the laser light is reflected by the emergent end EE of the PR crystal 102 and the reflectance on the emergent end EE is at least higher than that on the incident end IE. In this way, light loss in the PR crystal 102 is suppressed to a minimum level and a part of the laser light having the light intensity distribution thereof changed by the influence of the refractive index change in the PR crystal 102 is reflected at the emergent end EE to induce a refractive index change in the PR crystal 102 again, wherefore the refractive index change amount increases. In other words, since the refractive index change continues to vary for a long time without being stopped, a larger speckle noise reducing effect can be held for a long time. Specifically, reflectance at the emergent end EE is preferably 1% or higher and below 7%, which enables the speckle noise reducing effect to be increased while suppressing a reduction in light utility efficiency.

The side surfaces of the PR crystal 102 except the incident and emergent ends IE, EE preferably totally reflect the incident laser light in the PR crystal 102. In this case, the laser light is reflected by the side surfaces to increase an interference effect in the PR crystal 102 and increase a refractive index change, wherefore a larger speckle noise reducing effect can be obtained.

The refractive index changes in the PR crystal due to the light intensity distribution of the incident laser light itself and, even with the same output, a refractive index difference largely changes at a higher speed as a light intensity gradient in the crystal becomes steeper. Thus, the speckle noise reducing effect also increases. Thus, the light intensity gradient on the incident end IE of the PR crystal 102 is preferably large. In order to satisfy this, the laser light is so condensed as to have a focus point near the incident end IE of the PR crystal 102, for example, using the condenser lens 103 in this embodiment.

In this case, if it is assumed that a distance between a position where the intensity of the laser light is maximized in a plane perpendicular to a laser propagation direction LP and a closest position where a maximum value of the laser light intensity of $1/e^2$ is reached is a beam diameter, the beam diameter at the incident end IE of the PR crystal 102 is reduced to 100 μm or shorter and the refractive index difference largely changes at a high speed. Thus, a larger speckle noise reducing effect can be obtained. As a result, the speckle noise can be reduced in a projector-type image display device in which it is difficult to reduce the speckle noise.

However, if the beam diameter is too small, NA of outgoing light becomes too large and, therefore, light utilization efficiency decreases. Thus, the beam diameter is preferably 2 μm or longer. If the beam diameter on the incident end IE, i.e. the incident surface of the PR crystal 102 is 50 μm or shorter, the emergent end EE, i.e. the emergent surface of the PR crystal 102 is preferably formed to be a convex surface having a radius of curvature of 60 mm or shorter in order to reduce the diffusion of the outgoing light. In this way, the optical system can be more miniaturized.

Further, it is possible to further increase the refractive index change in the PR crystal and obtain a larger speckle noise reducing effect by changing the light intensity distribution of the incident laser light in the PR crystal. Thus, in this embodiment, the incident position of the laser light is changed, for example, by vibrating the PR crystal 102 in a direction orthogonal to the laser propagation direction LP using the vibrator 105. Specifically, the PR crystal 102 is so supported as to vibrate in the direction orthogonal to the laser propagation direction LP, and an inexpensive vibrating element which vibrates only along one axis such as a piezoelectric element can be, for example, used as the vibrator 105.

Here, since the speckle noise in a liquid crystal display or the like can be reduced, the incident position of the laser light on the PR crystal 102 is preferably changed in the direction orthogonal to the laser propagation direction LP by 20% or more of the beam diameter. Further, in order to realize a sufficient refractive index change even in a projector-type image display device in which it is difficult to reduce speckle noise, the incident position of the laser light on the PR crystal 102 is more preferably changed in the direction orthogonal to the laser propagation direction LP by 40% or more of the beam diameter.

It goes without saying that the smaller the beam diameter, the smaller the necessary amplitude. For example, in the case where laser light condensed to have a beam diameter of about 10 µm is incident, it is preferable to vibrate the incident position of the laser light on the PR crystal 102 at an amplitude of 2 µm or longer or 4 µm or longer in the direction orthogonal to the laser propagation direction LP for the above reason. Further, the member to be vibrated is not particularly limited to the PR crystal 102. For example, in the case of vibrating the condenser lens 103, a necessary vibration amplitude can be further reduced.

As described above, since the amplitude used in this embodiment is as small as about 1/10 of that given to the diffuser in the above patent literature 1, noise and power consumption caused by the vibration are hardly increased. In order to suppress the noise and power consumption increases caused by the vibration, the vibration amplitude in this embodiment is preferably below 40 µm. With the diffuser used in patent literature 1 or the like, the speckle noise reducing effect is obtained only while the incident position is moving. However, in the case of the PR crystal 102 of this embodiment, the speckle noise reducing effect continues for a specified period even if vibration stops after the incident position is moved. Thus, high-speed vibration as disclosed in patent literature 1 is not necessary in this embodiment. Further, with the vibration only along one axis using an inexpensive vibrating element, a moving speed of the incident position decreases at a position where the amplitude is highest. Therefore, although the speckle noise reducing effect decreases in the case of using the diffuser, this problem is alleviated in the case of this embodiment using the PR crystal 102.

As described below, it is also possible to further increase the refractive index change in the PR crystal 102 by using methods requiring no mechanical operating mechanism at all. In this case, since the vibrator 105 can be dispensed with and the PR crystal 102 can be fixedly held at a specified position, the construction of the device can be further simplified.

First of all, the light intensity distribution of laser light to be incident on the PR crystal 102 from the laser light source 101 may be changed. For example, the laser light to be incident on the PR crystal 102 from the laser light source 101 may be a lateral multi-mode laser light and the laser light source 101 may temporally change its mode. Alternatively, a plurality of laser light sources may be used as the laser light source 101, rays of light may be incident at the same position of the PR crystal 102 from the plurality of laser light sources and at least one laser output may be temporally changed. In this way, speckle noise can be reduced without requiring any mechanical operating mechanism that causes noise and power consumption increases.

Alternatively, the light intensity distribution of laser light in the PR crystal 102 may be changed by applying a specified voltage to the PR crystal 102 utilizing the electro-optic effect of the PR crystal 102. Also by doing so, speckle noise can be reduced without requiring any mechanical operating mechanism that causes noise and power consumption increases. In this case, it is more preferable to use a crystal with a large electro-optic constant such as a $LiNbO_3$ crystal.

Figure 2:
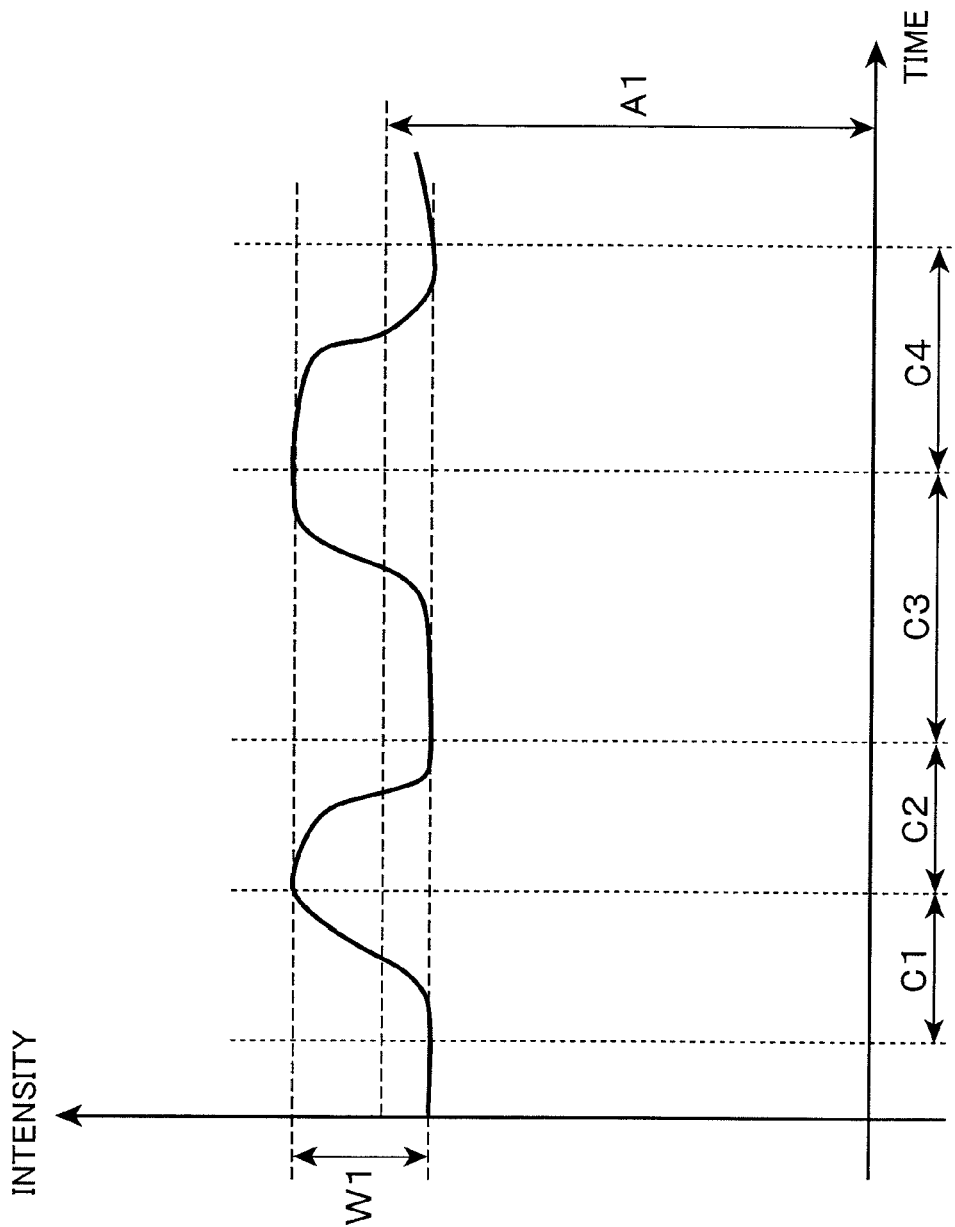
FIG. 2 is a graph showing an exemplary output variation of coherent light.

Alternatively, the intensity of laser light to be incident on the PR crystal 102 from the laser light source 101 may be changed. FIG. 2 is a graph showing an exemplary output variation of coherent light. An output variation of coherent light is preferably such that the intensity of laser light varies and a variation width W1 is 10% or more of an average intensity A1 as shown in FIG. 2, which enables speckle noise to be reduce3d in a liquid crystal display or the like. The variation width W1 is more preferably 30% or more of the average intensity A1, which enables speckle noise to be reduced in a projector-type image display device in which it is difficult to reduce the speckle noise. The output variation of the coherent light needs not necessarily be cyclical. In the example shown in FIG. 2, a first output variation period C1 is substantially equal to a second output variation period C2, but largely differs from third and fourth output variation periods C3, C4, and the third output variation period C3 differs from the fourth variation output variation C4.

Alternatively, the intensity of laser light may be changed, for example, by using a crystal with a thermal lens effect instead of the condenser lens 103 and intermittently driving the laser light source 101. In this way, lens power by the thermal lens varies depending on an output variation of the laser light and a beam diameter in the PR crystal 102 varies, wherefore the speckle noise reducing effect is held. Also by doing so, speckle noise can be reduced without requiring any mechanical operating mechanism that causes noise and power consumption increases.

In this case, it is preferable that the output of the laser light varies and a variation width of the laser light intensity is 5% or more of an average intensity. This makes it possible to obtain a larger speckle noise reducing effect and reduce speckle noise in a liquid crystal display or the like. The variation width of the laser light intensity is more preferably 15% or more of the average intensity, which enables speckle noise to be reduced in a projector-type image display device in which it is difficult to reduce the speckle noise.

Figure 3:
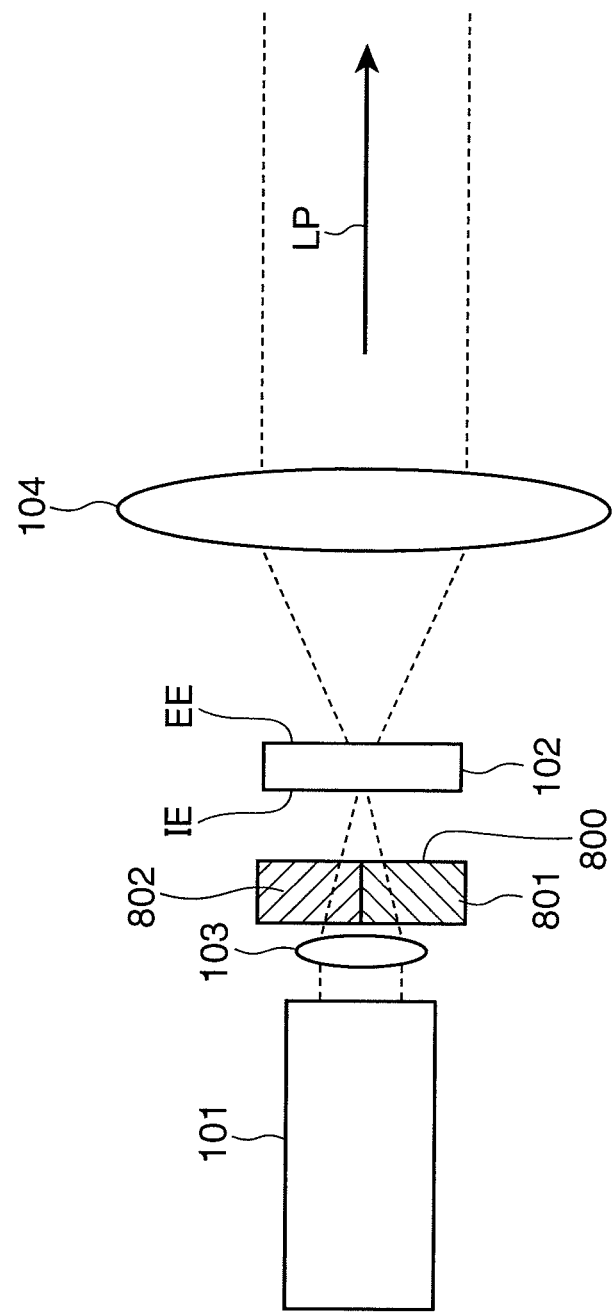
FIG. 3 is a conceptual diagram showing another exemplary construction of the light source device according to the first embodiment of the invention.

Alternatively, a polarization direction of laser light to be incident on the PR crystal 102 from the laser light source 101 may be changed. FIG. 3 is a conceptual diagram showing another exemplary construction of the light source device shown in the first embodiment of the present invention. In the example shown in FIG. 3, a PR crystal, in which a refractive index change by the PR effect depends on polarization, such as a $LiNbO_3$ is used as the PR crystal 102, and a liquid crystal device 800 made up of liquid crystals 801, 802 is inserted between the laser light source 101 and the PR crystal 102 (between the condenser lens 103 and the PR crystal 102) to rotate the polarization of the laser light incident on the PR crystal 102, thereby temporally changing the polarization direction. In this case, speckle noise can be reduced without requiring any mechanical operating mechanism that causes noise and power consumption increases.

The liquid crystal device 800 is preferably made up of at least two cells (two liquid crystals 801, 802), wherein rotation angles of polarization in the respective cells do not coincide. This enables the PR effect to be more effectively recovered. As for a method for changing the propagation direction of the laser light by the liquid crystal, the rotation angle of polarization may vary in a range of 10° or wider regardless of whether the liquid crystal includes one cell or plural cells. A variation cycle in this case is also preferably the one similar to the above output variation.

Figure 4:
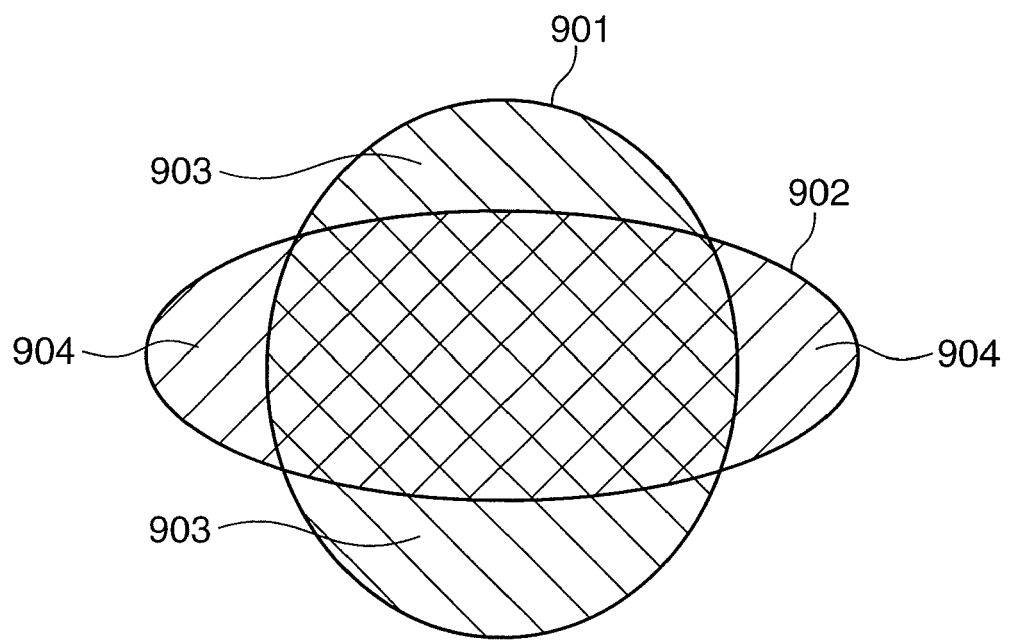
FIG. 4 is a diagram showing an exemplary variation of a light intensity distribution of coherent light.

Alternatively, the light intensity distribution of laser light may be changed using a crystal with a thermal lens effect. FIG. 4 is a diagram showing an exemplary variation of a light intensity distribution of coherent light. If the light intensity distribution on the incident surface of the PR crystal 102 in a certain moment is a region 901 and the light intensity distribution in another moment is a region 902 as shown in FIG. 4, two regions 903, 904 are those where the regions 901, 902 do not overlap.

Here, the area of at least one of the two regions 903, 904 is preferably 30% or higher of the entire output area (area of the regions 901, 902). In other words, if A1 to A4 denote the areas of the regions 901 to 904, it is preferable that A3/A1>0.3 or A4/A2>0.3. In this case, since the light intensity distribution of the laser light changes, the speckle noise reducing effect is held and effects similar to the above can be obtained. Further, a variation cycle in this case is also preferably the one similar to the above output variation for the same reason. A method for changing the light intensity distribution is not particularly limited to the one using the crystal with the thermal lens effect. For example, an output ratio may be changed using a plurality of laser light sources.

In the case of using a LiNbO$_3$ crystal as the PR crystal 102, the LiNbO$_3$ crystal is preferably used at 100° C. or lower since the PR effect inside is reduced if the LiNbO$_3$ crystal is heated to a high temperature and preferably used at 0° C. or higher in order to prevent beam scattering caused by condensation.

Similar effects are obtained even if a crystal which exhibits both the thermal lens effect and the PR effect is used as the PR crystal 102. For example, a LiNbO$_3$ crystal and the like are PR crystals which exhibit the thermal lens effect by absorbing a tiny part of incident light if light in a range from a visible region to an ultraviolet region is incident. In this case as well, the speckle noise reducing effect is held only by changing the output from the laser light source 101. Further, it becomes unnecessary to separately arrange a crystal which exhibits the terminal lens effect between the PR crystal 102 and the laser light source 101. Also in the case of using a PR crystal which exhibits the thermal lens effect, another thermal lens crystal or a PR crystal may be used in combination to further increase the thermal lens effect or the PR effect.

Alternatively, a laser light source which changes a beam diameter and/or a light intensity distribution of outgoing light according to an output variation may also be used as the laser light source 101. In this case as well, the speckle noise reducing effect is held only by emitting laser light with an output variation. Since it is not necessary to separately arrange a crystal which exhibits the thermal lens effect between the PR crystal 102 and the laser light source 101, a cost reduction and the miniaturization of the device can be realized by reducing the number of the components.

Figure 5:
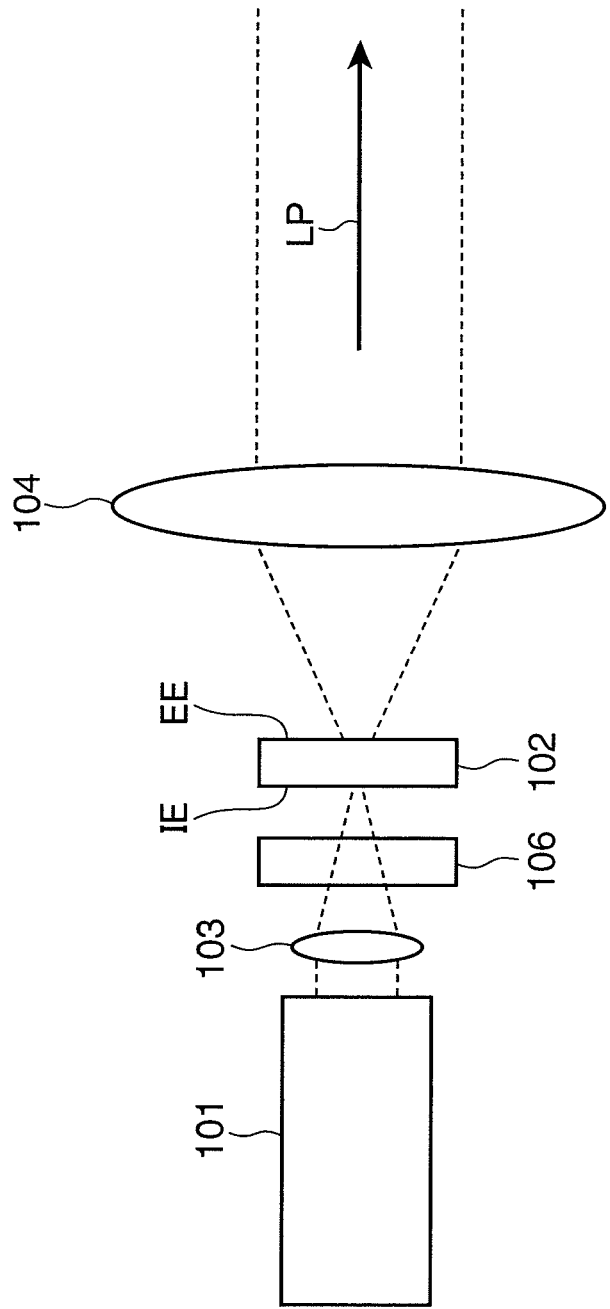
FIG. 5 is a conceptual diagram showing another exemplary construction of the light source device according to the first embodiment of the invention.

Alternatively, a deflection element formed by at least one of an electro-optic (EO) element or an acoustooptic (AO) element may be arranged on an optical path of coherent light and the incident position of the coherent light may be changed by the deflection element. FIG. 5 is a conceptual diagram showing another exemplary construction of the light source device shown in the first embodiment of the present invention.

As shown in FIG. 5, an electro-optic element 106 such as LiNbO$_3$ whose refractive index changes according to an electric field (and/or an acoustooptic element whose refractive index changes according to stress) may, for example, be arranged between the laser light source 101 and the PR crystal 102 and laser light may be scanned within such a width as to change the light intensity distribution in the PR crystal 102 by changing the polarization of the laser light. In this way, the speckle noise reducing effect can be held.

In this case as well, it is preferable to change the incident position on the PR crystal 102 by 20% or more of the beam diameter, and more preferable to change it by 40% or more for the above reason. Normally, it is difficult to largely change a refractive index only by an electro-optic element or an acoustooptic element. However, in the example shown in FIG. 5, a small change caused by the electro-optic element or the acoustooptic element causes a large and complicated refractive index change in the PR crystal 102, wherefore the speckle noise reducing effect is large.

Figure 6:
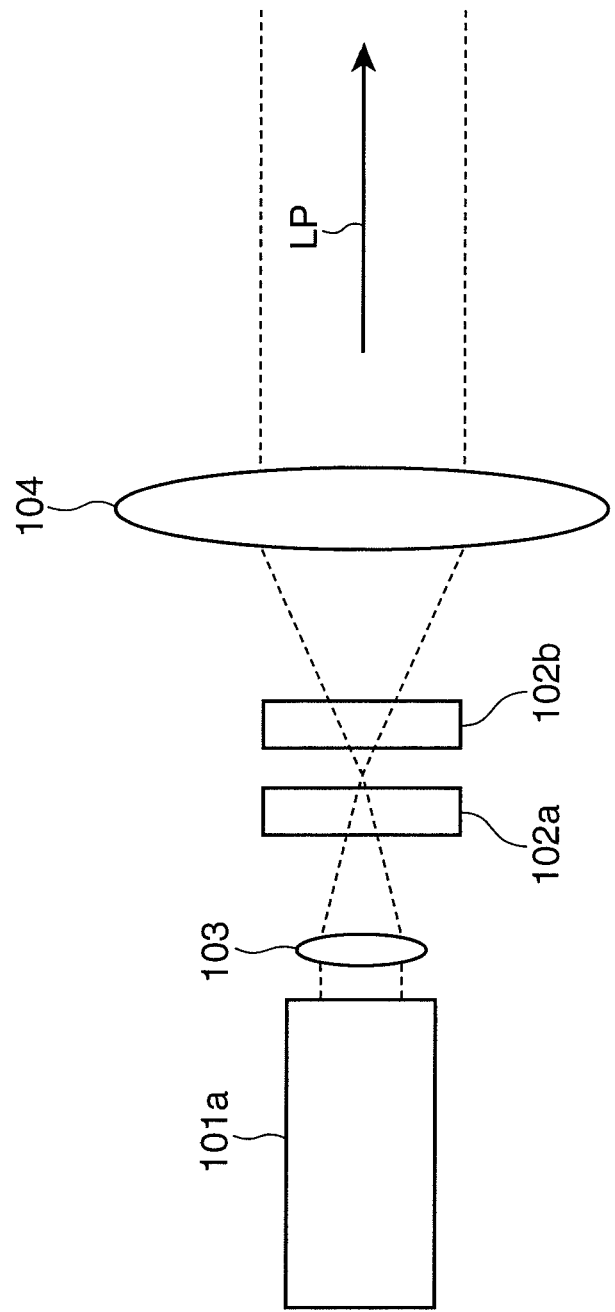
FIG. 6 is a conceptual diagram showing another exemplary construction of the light source device according to the first embodiment of the invention.

Instead of one PR crystal 102, a plurality of PR crystals which exhibit different photorefractive effects may also be used. FIG. 6 is a conceptual diagram showing another exemplary construction of the light source device according to the first embodiment of the present invention. In the example shown in FIG. 6, a laser light source 101*a* changes the intensity of laser light and light emitted from the laser light source 101*a* and having passed through a PR crystal 102*a* is incident on another PR crystal 102*b* different from the PR crystal 102*a*. In this case, the speckle noise reducing effect is further increased than in the case where one PR crystal is provided. It is preferable that at least one of the crystal material composition and shape of the first and second PR crystals 102*a*, 102*b* differs to exhibit different photorefractive effects. For example, it is preferable to use a material having a slow response speed in the order of ms (material with a long PR saturation period) as the first PR crystal 102*a* and use a material with a larger refractive index change as the second PR crystal 102*b*. In this way, a large speckle noise reducing effect can be continuously obtained.

Referring back to FIG. 1 again, it is preferable to form fine unevenness in at least one of the incident end IE and emergent end EE of the PR crystal 102. In this case, it is possible to reduce the speckle noise and, simultaneously, make the light intensity uniform. For example, by forming either one of the incident end IE and emergent end EE into a fine uneven surface (sand surface) in the order of several μm or smaller, the light intensity of the laser light is made uniform. The emergent end EE may also be processed into a microlens array or a microlens array made of another material may be bonded to the incident end IE or emergent end EE. In this case, light utilization efficiency can be improved by arbitrarily adjusting an irradiation region on an irradiated surface.

It is also preferable to provide the incident end IE with an uneven surface. In this case, a light intensity distribution of laser light incident on the PR crystal 102 becomes a finer pattern and a light intensity gradient also becomes steeper, wherefore a refractive index change by the PR effect increases. It is also preferable to use a plurality of PR crystals each having fine unevenness in the order of μm in an incident end IE or emergent end EE while placing them one over another. In this case, since a light intensity variation by the first PR crystal increases a light intensity variation by the second PR crystal, the speckle noise reducing effect increases.

In the case of using the above respective methods, no mechanical operating mechanism is required and vibration and power consumption increases do not occur. However, in the case of changing the intensity, polarization direction and light intensity distribution of laser light incident on the PR crystal to recover a refractive index change, it is preferable to determine variation cycles of the intensity, polarization direction and light intensity distribution in consideration of relation to an observation period, exposure period, measurement period and the like of a device using this light source device.

For example, in the case of using this light source device in a measuring device and obtaining a photographed image using a photographic film, a CCD camera or a CMOS camera, average outputs of laser light within a photographing period may be substantially equal and a light intensity may be uniform in a plane. In the case of using this light source device as an exposure device, average outputs within an exposure period may be substantially equal and a light intensity may be uniform in a plane. In other words, variation cycles of the intensity, polarization direction and light intensity distribution of laser light are preferably equal to or shorter than at least the photographing period or the exposure period, and an integral multiple of the variation cycle is preferably the photographing period or the exposure period.

In the case of real-time observation such as video recording or in the case where visually confirmable uniformity is necessary, variation cycles of the intensity, polarization direction and light intensity distribution of laser light are preferably at minimum equal to or higher than 30 cycles/sec that corresponds to a response speed of about 30 Hz of human eyes, i.e. 30 Hz or higher, more preferably 60 Hz or higher so as to reduce flickering, even more preferably 120 Hz or higher so as to be able to reduce the influence of the speckle noise even for viewing from a short distance of several tens of cm and most preferably 300 Hz or higher so as to reduce the influence of the speckle noise even for viewing for a long time.

In the case of setting a frame frequency of moving images to 300 Hz or higher, it is preferable to change the intensity, polarization direction or light intensity distribution of the laser light at a frequency which is an integral multiple or five-fold of the frame frequency. By doing so, a reduction of image quality can be suppressed since light intensity in one frame is uniform in a plane.

Here, the above variations cycle need not be necessarily perfectly cyclical. For example, in the case of 30 Hz, it is sufficient that a basic frequency is 30 Hz even if cycles below 30 Hz or those higher than 30 Hz are included without being particularly limited to the case where all the cycles are 30 Hz. This similarly holds for other frequencies. For example, in the case of changing the intensity of laser light, a variation requiring a variation width of 10% or more at a frequency of 60 Hz or higher may be a variation with a variation width of 10% or more at least for every 1/60 second. It goes without saying that the same can be said of preferable conditions for changing the light intensity distribution and the polarization direction.

In this light source device, the field lens 104 is used so as not to excessively enlarge the divergent light. In this case, by suppressing the excessive enlargement, the device can be miniaturized in the case of using this light source device in an image display device, measuring device or exposure device. The smaller the beam diameter of light incident on the PR crystal 102 and the thicker the PR crystal 102, the more a reduction of beam quality can be alleviated, wherefore the optical system after the PR crystal 102 can be miniaturized.

Thus, the thickness of the PR crystal 102 is preferably 2 mm or smaller and the light source device can be miniaturized to have such a size usable as a light source for a small-size projector. In this case, a PR crystal made of a ferroelectric substance or an organic material which realizes a sufficient speckle noise reducing effect even if being thin is used as the PR crystal 102. In the case of using a $LiNbO_3$, it is preferable to further increase the speckle noise reducing effect by the PR effect by doping Fe or Mn ions. It is further preferable to also use a method for increasing a refractive index change, for example, by vibrating the PR crystal 102 as described above.

Figure 7:
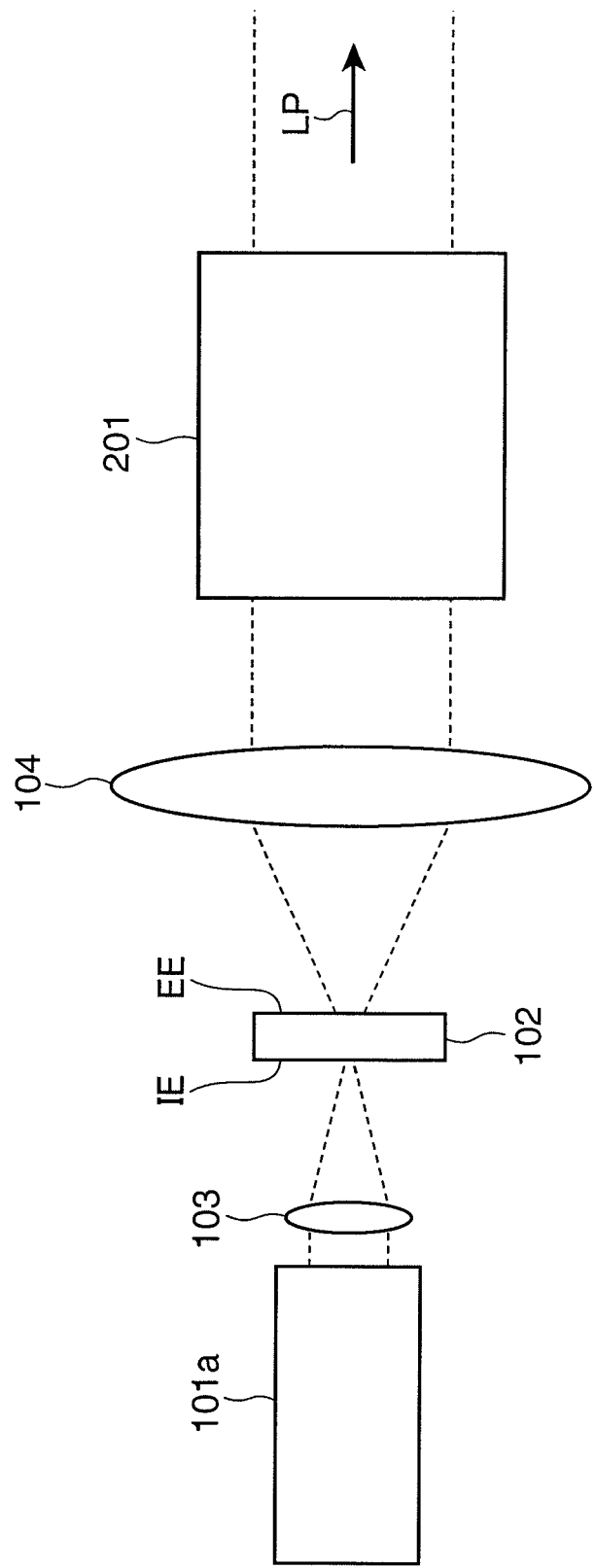
FIG. 7 is a conceptual diagram showing another exemplary construction of the light source device according to the first embodiment of the invention.

A light guide member may be arranged on an optical axis of laser light emitted from the PR crystal to suppress the diffusion of the laser light. FIG. 7 is a conceptual diagram showing the construction of a light source device using a light guide as another example of the light source device according to the first embodiment of the present invention. In the example shown in FIG. 7, a light guide 201 is arranged on an optical axis of laser light emitted from a PR crystal 102. The light guide 201 includes a rod integrator and the like and suppresses the diffusion of light. In this case, light utilization efficiency can be increased when this light source device is used as a light source for a laser projector using a spatial modulation element such as liquid crystal device.

Further, the light guide 201 may be omitted and a PR crystal long in the laser propagation direction LP and having a small cross-sectional area perpendicular to the laser propagation direction LP may be used instead of the PR crystal 102. In this case, the PR crystal itself can function as a rod integrator by totally reflecting laser light by a side surface thereof. Furthermore, by extending the length of the PR crystal, the PR effect the laser light receives also increases to increase the speckle noise reducing effect.

By narrowing the cross-sectional area of the rod integrator to increase the reflection of the coherent light by the side surface, an interference effect in the PR crystal increases to increase the refractive index change, wherefore a large speckle noise reducing effect can be obtained. Here, the cross-sectional area of the rod integrator is preferably 9 $mm^2$ or smaller. In this case, speckle noise in a liquid crystal display or the like can be reduced. Further, the cross-sectional area of the rod integrator is more preferably 1 $mm^2$ or smaller. In this case, speckle noise can be reduced also in a projector-type image display device in which it is difficult to reduce the speckle noise.

A multi-mode fiber made of a PR crystal may be used as a narrow and long light guide made of a PR crystal. By using the multi-mode fiber doped with a material which exhibits the PR effect, a cost reduction can be realized. It also becomes possible to construct an optical system which can be easily handled and is unlikely to be influenced by external environments such as vibration and heat. As described above, a beam is preferably incident on the vicinity of an incident end of the rod integrator or the multi-mode fiber while being maximally narrowed down. In the case of uniting the PR crystal and the light guide (rod integrator, multi-mode fiber), the number of end surfaces laser light passes can be reduced in addition to a cost reduction and miniaturization by a reduction in the number of optical components. Therefore, light loss by reflection at the end surfaces can also be reduced.

(Second Embodiment)

In this embodiment is illustrated a light source device which can be commonly used in an image display device, a measuring device, an exposure device, a lighting device and the like and can reduce speckle noise presenting a problem in these devices utilizing a thermal lens effect.

Figure 8:
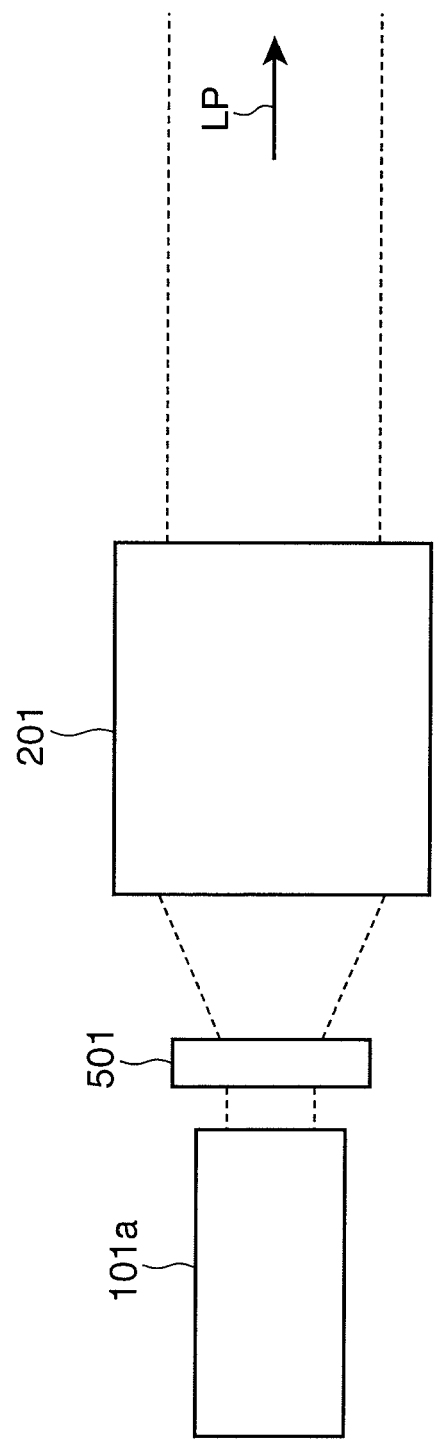
FIG. 8 is a conceptual diagram showing an exemplary construction of a light source device according to a second embodiment of the invention.

FIG. 8 is a conceptual diagram showing an exemplary construction of a light source device according to a second embodiment of the present invention. This light source device is at least provided with a laser light source 101a, a thermal lens crystal 501 which exhibits a thermal lens effect for laser light emitted from the laser light source 101a and having a specified wavelength, and a light guide 201. By causing laser light (coherent light) emitted from the laser light source 101a to be incident on the thermal lens crystal 501, a part of the laser light is absorbed in the thermal lens crystal 501 to induce a refractive index distribution due to a temperature gradient caused by generated heat. Further, the laser light source 101a changes the intensity of the laser light with time, whereby the generated temperature distribution and the refractive index distribution caused thereby change. Therefore, it becomes possible to change an interference pattern on an irradiated surface.

Since this thermal lens effect can change the interference pattern at a higher speed by narrowing the beam diameter of the incident laser light and a refractive index change is continued only by an output variation, speckle noise can be reduced by a simple construction. Further, since a refractive index change amount increases as the output variation increases, a variation width of the intensity of the laser light is preferably 30% or more of an average intensity in this embodiment. In this way, an effect of sufficiently reducing speckle noise can be obtained in an image display device including a liquid crystal display. Further, the variation width of the intensity of the laser light is preferably 80% or more of an average intensity in this embodiment. In this way, the effect of sufficiently reducing speckle noise can be obtained in a projector-type image display device.

Since the thermal lens effect loses its speckle noise reducing effect if a temperature distribution in a beam path part, it is preferable to vary the output in a time period shorter than a period required for the temperature distribution to stabilize. In this way, a larger speckle noise reducing effect can be obtained.

Further, a large refractive index change can be produced and the speckle noise reducing effect increases as an interaction length of the laser light and the thermal lens crystal 501 increases. Further, the period required for the temperature distribution to stabilize can be extended, whereby the large speckle noise reducing effect can be held even with an output variation having a longer period.

Further, the refractive index change (temperature distribution change) in the thermal lens crystal 501 can be further increased by changing a light intensity distribution of laser light incident on the thermal lens crystal 501. Foe example, similar to the first embodiment, the thermal lens crystal 501 may be vibrated by a vibrator to change the incident position.

In this case, it is preferable to vary a beam center with an amplitude equal to or longer than a distance corresponding to 40% of the beam diameter. In this way, the speckle noise reducing effect increases and the refractive index is so changed as to be able to reduce speckle noise in a liquid crystal display. It is more preferable to vary the beam center with an amplitude equal to or longer than a distance corresponding to 70% of the beam diameter. In this way, the refractive index can be so changed as to be able to reduce speckle noise in a projector-type image display device in which it is difficult to reduce the speckle noise.

By selecting a thermal lens crystal having a two-photon absorption property as the thermal lens crystal 501, it becomes possible to form a large refractive index gradient at a position closer to the center of the incident beam and a change amount of the refractive index gradient caused by the output variation increases. Thus, even with a smaller light absorption amount, a large speckle noise reducing effect can be obtained.

Since a preferable amplitude can be smaller as the beam diameter decreases, laser light condensed to have a beam diameter of about 10 µm is preferably incident on the thermal lens crystal 501. In this case, for the above reason, the thermal lens crystal 501 is preferably vibrated to have an amplitude of 4 µm or larger, more preferably vibrated to have an amplitude of 7 µm. For vibration having such an amplitude, the thermal lens crystal 501 can be sufficiently vibrated by the vibration of a fan or the like for cooling the laser light source 101a even if no special vibrator is provided. Since the preferable amplitude in this embodiment is as small as about 1/100 of the vibration given to the diffuser in patent literature 1, noise and power consumption are hardly increased. In order to suppress a power consumption increase, the amplitude of the vibration in this embodiment is preferably 70 µm or smaller.

As described below, the refractive index change in the thermal lens crystal 501 can be further increased also using a method requiring no mechanical operating mechanism at all. For example, similar to the light source device shown in FIG. 3, a crystal, in which a refractive index change caused by the thermal lens effect depends on polarization, such as a $LiNbO_3$ crystal or a $LiTaO_3$ crystal may be used as the thermal lens crystal 501 and a liquid crystal device or the like may be arranged between the laser light source 101a and the thermal lens crystal 501 to temporally change a polarization direction of incident laser light.

Further, similar to the light source device shown in FIG. 5, an electro-optic element or an acoustooptic element which is made of $LiNbO_3$ or the like and in which a refractive index is changed according to an electric field may be arranged between the laser light source 101a and the thermal lens crystal 501, whereby the polarization of laser light is changed to scan the laser light within such a width as to change a light intensity distribution in the thermal lens crystal 501, thereby changing a light intensity distribution of laser light incident on the thermal lens crystal 501. Normally, it is difficult to largely change a refractive index only by an electro-optic element or an acoustooptic element. However, in this example, a displacement caused by a small refractive index variation causes a large refractive index change in the thermal lens crystal 501, wherefore speckle noise can be reduced. Similar effects can be obtained also in the case of using an acoustooptic element.

In the case of using these methods, no mechanical operating mechanism is required and problems of noise and power consumption increases do not occur. However, in the case of changing the output variation and the intensity, polarization direction and light intensity distribution of light incident on the thermal lens effect 501 to increase the refractive index change, it is preferable to determine variation cycles of the intensity, polarization direction and light intensity distribution in consideration of relation to an observation period of a device using this light source device.

For example, in the case of using this light source device in a measuring device or the like and obtaining a photographed image using a photographic film, a CCD camera or a CMOS camera, highly accurate measurements are possible if average outputs of laser light within a photographing period are substantially equal and a light intensity is uniform in a plane. In the case of using this light source device as an exposure device, uniform exposure is possible if average outputs within an exposure period are substantially equal and a light intensity is uniform in a plane. In other words, variation cycles of the intensity, polarization direction and light intensity distribution of laser light are preferably equal to or shorter than at least the photographing period or the exposure period, and an integral multiple of the variation cycle is preferably the photographing period or the exposure period.

In the case of real-time observation such as video recording or in the case where visually confirmable uniformity is necessary, variation cycles are preferably at minimum equal to or higher than 30 cycles/sec that corresponds to a response speed of about 30 Hz of human eyes, more preferably 60 or more cycles/sec so as to reduce flickering, even more preferably 120 or more cycles/sec so as to eliminate burdens on eyes even for viewing from a short distance of several tens of cm and most preferably 300 or more cycles/sec so as to eliminate burdens on eyes even for viewing for a long time. In the case of wishing to increase a frame frequency of moving images, it is preferable to change the intensity, polarization direction or light intensity distribution of the laser light at a frequency which is an integral multiple or five-fold of the frame frequency. By doing so, a light intensity distribution of each frame becomes uniform, whereby a reduction of image quality can be suppressed.

Here, the variation of the intensity, polarization direction or light intensity distribution of the laser light needs not be such that absolutely the same change cyclically repeats. For example, in the case of changing the intensity of the laser light, a variation requiring a variation width of 10% with 60 or more cycles/sec may be a variation having a variation width of 10% or more at least every 1/60 sec. It goes without saying that the same can be said of preferable conditions for changing the light intensity distribution and the polarization direction.

Further, in the case of using this light source device as a light source for a laser projector using a spatial modulation element such as liquid crystal device, laser light emitted from the thermal lens crystal 501 may be incident on the light guide 201 such as a rod integrator similar to the first embodiment in order to increase light utility efficiency.

Further, the light guide 201 may be omitted and a thermal lens crystal long in the laser propagation direction LP and having a small cross-sectional area perpendicular to the laser propagation direction LP may be used instead of the thermal lens crystal 502. In this case, the thermal lens crystal itself can function as a rod integrator by totally reflecting laser light by a side surface thereof. Furthermore, by extending the length of the thermal lens crystal, the thermal lens effect the coherent light receives also increases to increase the speckle noise reducing effect and a thermal capacity increases to extend a period until a temperature change (refractive index change) reaches saturation. Further, a multi-mode fiber made of a thermal lens crystal may be used as a narrow and long light guide made of a thermal lens crystal.

The cross-sectional area of the rod integrator is preferably 3 mm$^2$ or smaller. In this case, speckle noise in a liquid crystal display or the like can be reduced. Further, the cross-sectional area of the rod integrator is more preferably 0.5 mm$^2$ or smaller. In this case, speckle noise can be reduced also in a projector-type image display device in which it is difficult to reduce the speckle noise.

(Third Embodiment)

In this embodiment is illustrated an image display device which reduces speckle noise. Although a light source device used in this embodiment is mainly used as a light source for the image display device, it is also applicable to a lighting device or the like.

Figure 9:
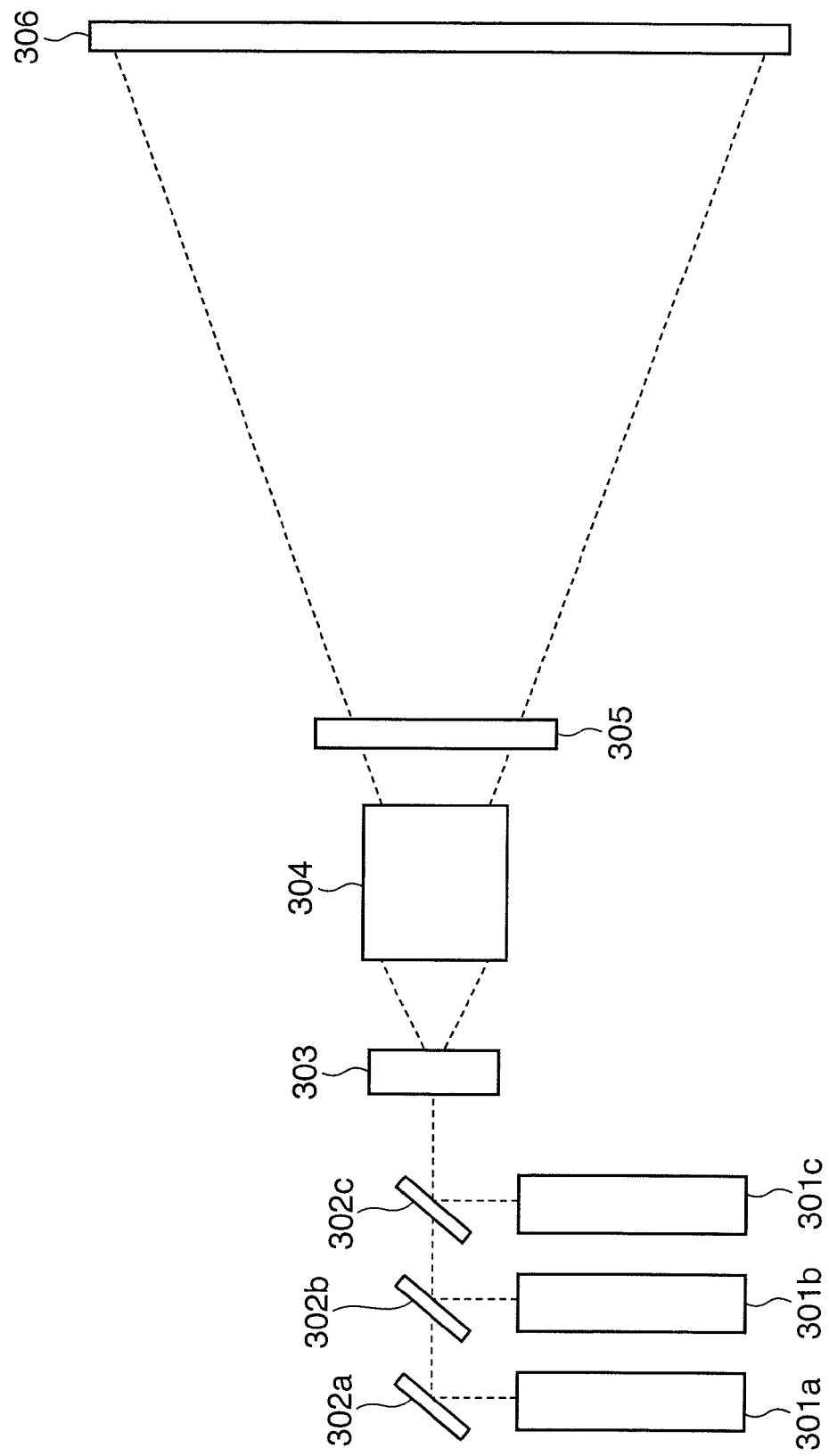
FIG. 9 is a conceptual diagram showing an exemplary construction of a light source device according to a third embodiment of the invention.

FIG. 9 is a conceptual diagram showing an exemplary construction of an image display device according to a third embodiment of the present invention. As shown in FIG. 9, the image display device of this embodiment is provided with a plurality of laser light sources 301a, 301b and 301c, a plurality of dichroic mirrors 302a, 302b and 302c, a PR crystal 303, a light guide 304 and a spatial modulation element 305, wherein a light source device is constructed by the plurality of laser light sources 301a, 301b and 301c, the plurality of dichroic mirrors 302a, 302b and 302c, the PR crystal 303 and the light guide 304.

A case is described below where red (R), green (G) and blue (B) laser light sources capable of improving the color reproducibility of an image are used in the case of using light sources for an image display device utilizing laser light as the plurality of laser light sources 301a, 301b and 301c. The number and wavelengths of the laser light sources are not particularly limited to the following example, and various changes such as the use of two, four or more laser light sources can be made.

The red, green and blue laser light sources 301a, 301b and 301c respectively emit red, green and blue (hereinafter, RGB) laser light. Three colors of laser light are superimposed using the dichroic mirrors 302a, 302b and 302c to be incident on the PR crystal 303. Here, the dichroic mirror 302a reflects at least the laser light emitted from the laser light source 301a, and the dichroic mirror 302b transmits the laser light emitted from the laser light source 301a while reflecting the laser light emitted from the laser light source 301b. Further, the dichroic mirror 302c transmits the laser light emitted from the laser light sources 301a, 301b while reflecting the laser light emitted form the laser light source 301c.

In this embodiment, the three colors of laser light are incident on one PR crystal 303, whereby the RGB light are diffused by a refractive index change in the PR crystal 303. For example, the diffused RGB light are incident on the spatial modulation element 305 to project an image onto a screen 306 after being incident on the light guide 304. As a result, light utilization efficiency can be improved and a lower power consuming image display device can be realized.

Here, a light guide mixed with a material to serve as a PR crystal may be used instead of the PR crystal 303 and the light guide 304 as described in the first embodiment. In this case, a cost reduction is possible by an effect of reducing the number of components similar to the first embodiment. Further, instead of the PR crystal 303 and the light guide 304, a thin PR crystal may be arranged very close to the spatial modulation element 305 or bonded to the spatial modulation element 305. In this case, the entire image display device can be further miniaturized.

A combination of a liquid crystal device and a polarizer, a DMD (digital mirror device) element or the like may be, for example, as the spatial modulation element 305. Although the transmissive spatial modulation element is shown in FIG. 9, a reflective spatial modulation element may also be used.

Here, in an image display device in which three colors RGB of light are incident on one spatial modulation element, the laser light sources are preferably respectively pulse-driven at duties of 33% or lower to emit the laser light of at least one color for a period different from that for the laser light of at least another color as a method for emitting the three colors RGB of light in order to improve the color reproducibility of a display image. Further, the laser light sources are preferably pulse-driven at duties of 30% or lower for the respective colors to provide moments in which no light is emitted between the three colors RGB of light, whereby the disturbance of an image induced by poor time response of the spatial modulation element can be reduced.

Since refractive index distributions generated in the PR crystal 303 for RGB laser light of the respective wavelengths differ in this embodiment, the refractive index change in the PR crystal is constantly induced by temporally changing the wavelength of light incident on the PR crystal 303 as described above. Thus, the three colors RGB of light particularly preferably overlap at least in a part of the PR crystal 303. In this case, by causing the three colors RGB of light to be incident on the PR crystal 303, an interference pattern of the laser light on a screen 306 can be temporally changed at a higher speed as compared with the case where the three colors RGB of light are respectively independently incident on the PR crystal 303, wherefore speckle noise can be reduced. For example, an overlap area of first laser light (e.g. red laser light) and second laser light (e.g. blue laser light) of the three colors RGB of light at an emergent end of the PR crystal 303 is preferably 30% or more of the total area of the first and second laser light.

However, a position where the light intensity of G (green) light is highest and a position where the light intensity of B (blue) light is highest are preferably displaced by 2 μm or longer on an incident surface of the PR crystal 303. This enables a further increase of the PR effect and a speckle noise reduction in a projector-type image display device in which it is difficult to reduce the speckle noise.

Out of the light incident on the same PR crystal 303, the wavelength of the light having a longest wavelength is preferably 1.14 times as long as or longer than the wavelength of the light having a shortest wavelength. In this case, a larger speckle noise reducing effect can be obtained. As a result, a more preferable speckle noise reducing effect can be realized in a projector-type image display device using a spatial modulation element such as a liquid crystal device or a DMD device. Further, the wavelength of the light having the longest wavelength is more preferably 1.32 times as long as or longer than the wavelength of the light having the shortest wavelength. In this case, it is also possible to reduce speckle noise of a projector-type image display device using a small-size spatial modulation element of 0.2 inches or shorter.

Since the refractive index change produced in the PR crystal 303 is further increased by temporally changing a light intensity distribution of three colors of laser light incident on the PR crystal 303, at least one of the RGB laser light is preferably so incident on the PR crystal 303 as to have a light intensity distribution different from the other two light. For example, at least one of the RGB laser light preferably has a beam diameter different from those of the other two light. Alternatively, it is preferable that at least one of the RGB light is a multi-beam and a profile (light intensity distribution) thereof at the incident end of the PR crystal 303 is different from that of at least one of the others. Further, at least one of the RGB light preferably has a beam center (optical axis) different from that of at least one of the others in the PR crystal 303. By these, the speckle noise reducing effect further increases.

A variation width of the intensity of laser light emitted from at least one of the red, green and blue laser light sources 301$a$, 301$b$ and 301$c$ is preferably 10% or more of an average intensity of this laser light. Further, laser light emitted from a first coherent light source out of the red, green and blue laser light sources 301$a$, 301$b$ and 301$c$ and laser light emitted from a second coherent light source preferably differ in at least one of a light intensity distribution, a polarization direction and an intensity. In these cases, it is possible to increase the PR effect and reduce speckle noise of a projector-type image display device in which it is difficult to reduce the speckle noise.

In the case of using the light source device used in the image display device of this embodiment as a light source for a lighting device, it is preferable to include laser light sources having a plurality of wavelengths. In this case, the lighting device can produce light of an arbitrary color.

Although the light source device using the RGB laser light sources as the light sources for the image display device is shown in this embodiment, it goes without saying that similar effects can be obtained even if oscillation wavelengths and the number of the laser light sources differ. For example, two laser light having different wavelengths may be outputted from two light sources or two or more laser light having different wavelengths may be outputted from one light source. However, it is preferable to use two or more laser light sources, more preferable to use laser light sources having two or more wavelengths in order to increase the refractive index change in the PR crystal 303.

In the case where the light source device used in this embodiment is used in an image display device or a lighting device and visually confirmable uniformity is necessary, cycles of light intensity distribution variations and wavelength variations of the laser light incident on the PR crystal 303 are preferably at minimum equal to or higher than 30 cycles/sec that corresponds to a response speed of about 30 Hz of human eyes, more preferably 60 or more cycles/sec so as to reduce flickering, even more preferably 120 or more cycles/sec so as to eliminate burdens on eyes even for viewing from a short distance of several tens of cm and most preferably 300 or more cycles/sec so as to reduce burdens on eyes even for viewing for a long time. Further, for a speckle noise reduction, it is preferable to use a PR crystal in which a refractive index variation does not stop within a period which is one frame of a moving image.

Although the image display device using one spatial modulation element 305 is shown in this embodiment, it goes without saying that, after three colors of light having passed through the PR crystal 303 are separated and respectively incident on different spatial modulation elements, images of three colors may be combined again by a cross prism or the like. Further, although the example using the PR crystal is shown in this embodiment, a thermal lens crystal may be used similar to the second embodiment. In the case of the thermal lens crystal as well, the speckle noise reducing effect increases since the refractive index variation continues to change without being stopped by causing light having different wavelengths to be incident on the same thermal lens crystal and varying the intensity of the light of at least one wavelength.

(Fourth Embodiment)

Figure 10:
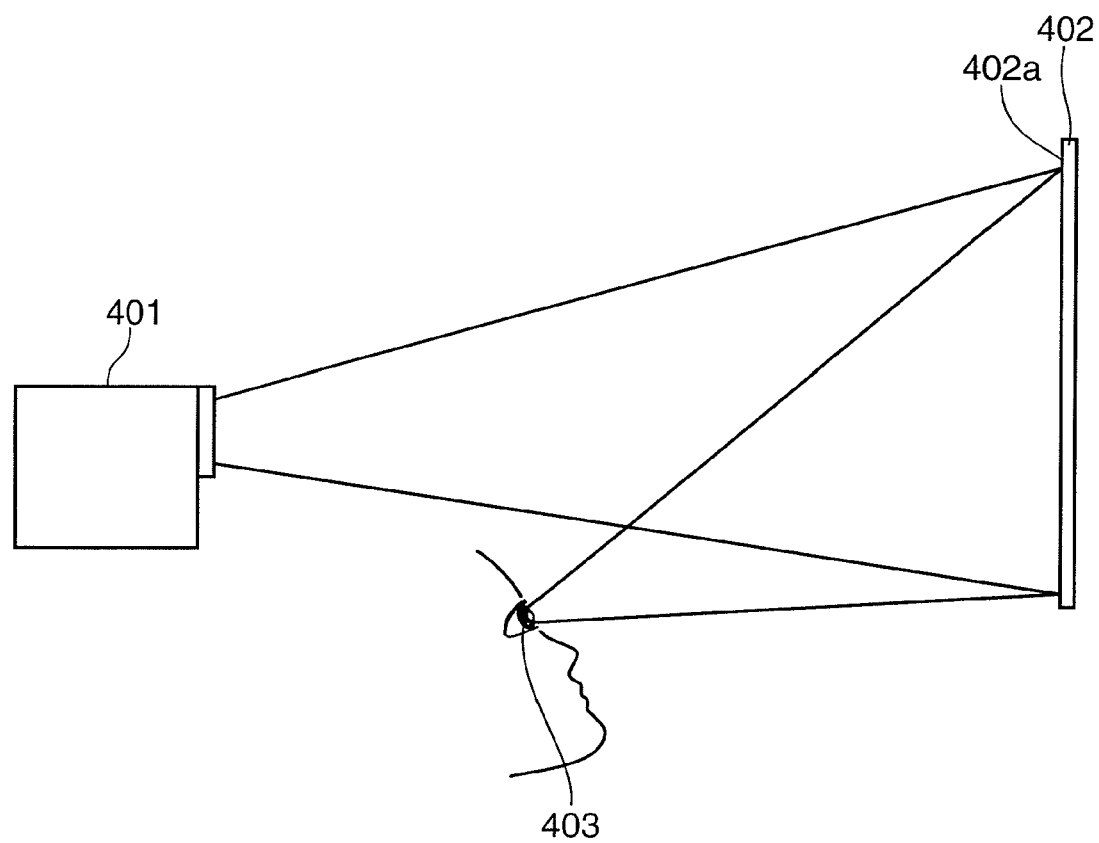
FIG. 10 is a conceptual diagram showing an exemplary construction of a light source device according to a fourth embodiment of the invention.

In this embodiment is illustrated an image display device using a screen member for reducing speckle noise produced on the retinas of an observer. FIG. 10 is a conceptual diagram showing an exemplary construction of an image display device according to a fourth embodiment of the present invention.

As shown in FIG. 10, the image display device of this embodiment is provided with a projector 401 and a PR screen 402, wherein light emitted from the projector 401 using a coherent light source such as a laser light source is irradiated to the PR screen 402 as a screen member which exhibits a PR effect. The projector 401 includes a light source device constructed similar to those of the above first to third embodiments except that the PR crystal inside is omitted, and the light source device emits red, green and blue laser light and changes at least one of a light intensity distribution and a polarization direction of at least one laser light. The PR screen 402 includes a display layer 402a made of a PR crystal and is manufactured, for example, by forming a display layer made of a PR crystal on a conventional screen or by applying a display layer containing particles of a PR crystal to a screen.

The PR screen 402 is arranged on an optical path between the projector 401 and retainers 403 of an observer and can reduce speckle noise as interference patterns produced on the retinas 403 of the observer by exhibiting a PR effect. By exhibiting the PR effect on the screen, a viewing angle of the image display device can also be widened.

In the case of using a scanning laser projector as the projector 401, speckle noise of the scanning laser projector in which it is difficult to reduce the speckle noise can also be reduced in this embodiment. Scanning laser projectors are particularly expected as projectors with small power consumption, but it is particularly difficult to reduce speckle noise, which has presented a big problem. Thus, the effects of this embodiment are more significant. It goes without saying that a projector for forming an image using a spatial modulation element may be used as the projector 401. In this case, a high-luminance projector can be realized.

Further, since a light intensity distribution on the PR screen 402 drastically changes as moving images are reproduced by using a projector including a spatial modulation element and a laser scanner in this embodiment, a refractive index change amount also increases. As a result, the interference patterns produced on the retinas 403 of the observer can be continuously changed, wherefore an effect obtained as if by superimposing and averaging countless interference patterns can be obtained and speckle noise can be reduced.

If there is a moment when the change of the interference pattern stops, the reducing effect decreases by that much. However, in this embodiment, the interference pattern preferably continues to change without being stopped. For example, in the image display device, the speckle noise reducing effect increases by the superimposition of a plurality different interference patterns in one frame of a moving image.

Although the PR screen 402 is used as a screen for the projector in this embodiment, it goes without saying that similar effects can be obtained with a liquid crystal display including a layer made of a PR crystal on the top surface of a liquid crystal panel or a rear projection display including a layer made of a PR crystal on the top or under surface of a screen.

However, in the case of using a layer made of a PR crystal for these applications, the thickness of the layer that exhibits the PR effect is preferably 2 mm or smaller since the sharpness of an image decreases if the layer that exhibits the PR effect is too thick. In this way, a sharp image can be obtained when the image is viewed from a position distant about 3 m from the screen. This thickness is preferably 1 mm or smaller to enable a sharp image to be obtained when the image is viewed from a position distant about 1 m, and preferably 0.5 mm or smaller to enable a sharp image to be displayed even in the case of the use as a portable image display device.

(Fifth Embodiment)

Figure 11:
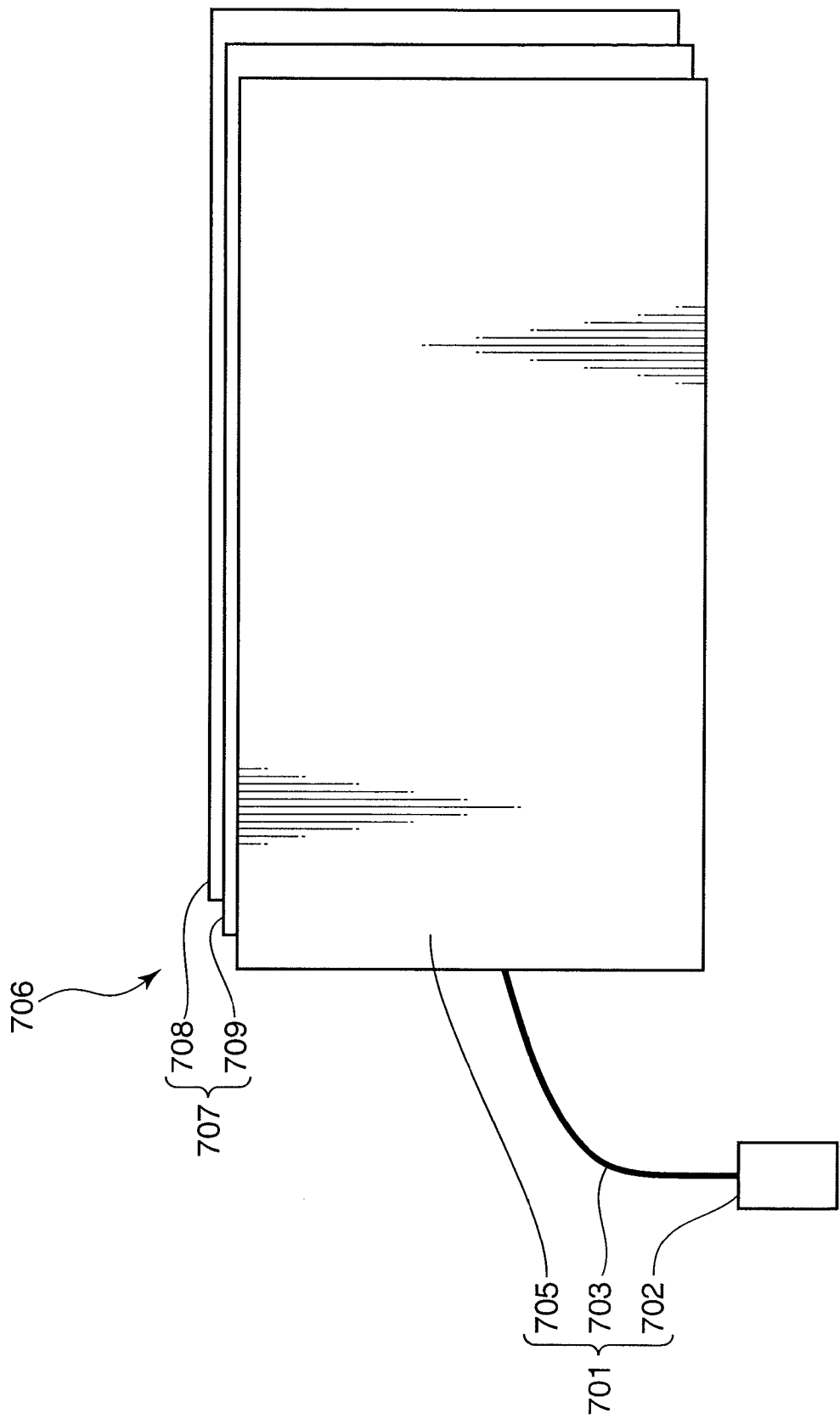
FIG. 11 is a conceptual diagram showing an exemplary construction of a light source device according to a fifth embodiment of the invention.

In this embodiment is illustrated an image display device and a lighting device using a light source device constructed similar to the light source device shown in the first or second embodiment. FIG. 11 is a conceptual diagram showing an exemplary construction of an image display device according to a fifth embodiment of the present invention.

As shown in FIG. 11, a liquid crystal display device 706 is provided with a liquid crystal display panel 707 as a spatial modulation element and a backlight lighting device 701 for illuminating the liquid crystal display panel 707 from behind, wherein the liquid crystal display panel 707 includes a polarizer 708 and a liquid crystal plate 709 and the backlight lighting device 701 includes a laser light source 702, a light guide member 703 and a light guide plate 705.

The laser light source 702 as a light source of the backlight lighting device 701 is constructed similar to the light source device of the first or second embodiment and includes laser light sources for respectively emitting at least R (red), G (green) and B (blue) laser light.

Here, a semiconductor laser having a wavelength of 640 nm and made of a AlGaInP/GaA material is used as the red laser light source, and a semiconductor laser having a wavelength of 450 nm and made of a GaN material is used as the blue laser light source. Further, the green laser light source includes an infrared laser light source and a nonlinear optical crystal, wherein infrared laser light emitted from the infrared laser light source is incident on the nonlinear optical crystal to be converted into green laser light as a second harmonic of the infrared laser light, whereby green light can be generated with high efficiency.

The constructions of the respective laser light sources are not particularly limited to the above example and various changes can be made. Similar to the fourth embodiment, interference patterns of laser light on the retinas of an observer of the image display device may be changed without using the light source device of the first or second embodiment.

In the backlight lighting device 701, three colors of laser light from the laser light source 702 are collectively guided to the light guide plate 705 via the light guide member 703 and emitted from a principal surface (not shown) of the light guide plate 705. The liquid crystal display panel 707 displays an image utilizing light emitted from the backlight lighting device 701. As a result, in this embodiment, it is possible to reduce speckle noise and realize an image display device with good color reproducibility and low power consumption.

Although the liquid crystal display device using the transmissive liquid crystal panel as the spatial modulation element is shown here as the image display device using the laser light source, it goes without saying that similar effects are obtained even for an image display device such as a projector using a DMD mirror or a reflective LCOS as a spatial modulation element. The backlight lighting device 701 in itself serves as a lighting device using the light source device of the first or second embodiment and can also be used as a light source for a measuring device or an exposure device by using a laser light source having a desired wavelength instead of the laser light source 702.

It goes without saying that the constructions shown in the above respective embodiments in this specification are merely examples and various changes can be made without departing from the gist of the present invention. In the present invention, an interference pattern on an irradiated surface is continuously changed, whereby an effect obtained as if by superimposing and averaging countless interference patterns can be obtained and speckle noise can be reduced.

If there is a moment when the change of the interference pattern stops, the reducing effect decreases by that much. The interference pattern continues to change without being stopped, whereby the interference pattern changes faster than a frame speed of moving images and a plurality different interference patterns are superimposed to increase the speckle noise reducing effect, for example, in an image display device.

The image display devices utilizing coherent light use the spatial modulation elements such as liquid crystal devices for changing a light intensity distribution on an irradiated surface. Since these are fixed at certain light intensity distributions for each frame of image and the interference patterns are fixed, the speckle noise reducing effect is small. Thus, the speckle noise needs to be reduced by providing means for causing the interference pattern on the irradiated surface to continuously change also between frames of images in addition to the spatial modulation element for image display.

Although image display applications are mainly described above, it goes without saying that the present invention is applicable to other applications. In other words, by using the present invention, it is possible to eliminate measurement errors and improve the quality of faint images in various optical measurements, image generation, and the like utilizing coherent light such as laser light. Accordingly, the present invention is highly useful to various measuring instruments, image/video display instruments, exposure lithographic devices used for producing a circuit on a semiconductor substrate, lighting devices and the like utilizing lasers.

The present invention is summarized as follows from the above respective embodiments. Specifically, a light source device according to the present invention is for illuminating an illumination object with coherent light and comprises a coherent light source for emitting the coherent light; and a pattern changer for changing an interference pattern of the coherent light on a surface of the illumination object, wherein the pattern changer includes a photorefractive crystal which is arranged between the coherent light source and the illumination object and on an optical path of the coherent light and exhibits a photorefractive effect and a changer for changing at least one of a light intensity distribution, a polarization direction, a wavelength and an intensity of coherent light incident on the photorefractive crystal.

In this light source device, since at least one of the light intensity distribution, polarization direction, wavelength and intensity of the coherent light incident on the photorefractive crystal is changed, an amount of a refractive index change in the photorefractive crystal can be recovered. As a result, noise and power consumption can be low and speckle noise can be continuously reduced by temporally changing the interference pattern on an irradiated surface.

The photorefractive crystal preferably includes a first photorefractive crystal which exhibits a first photorefractive effect and a second photorefractive crystal which is different in at least one of crystal material composition and shape and exhibits a second photorefractive effect different from the first photorefractive effect.

In this case, a large speckle noise reducing effect can be continuously obtained, for example, by using a material having a slow response speed to a reduction of the photorefractive effect as the first photorefractive crystal and using a material having a large refractive index change amount as the second photorefractive crystal.

The light source device preferably further comprises a light guide member arranged on an optical path of the coherent light emitted from the photorefractive crystal and adapted to suppress the diffusion of the coherent light.

In this case, light utilization efficiency can be improved since the diffusion of the coherent light is suppressed.

It is preferable that the photorefractive crystal is a crystal made of $LiNbO_3$ doped with Fe and that the doping concentration of Fe is 0.002% or higher and below 0.1%.

In this case, a refractive index change amount capable of reducing speckle noise in a liquid crystal display can be obtained and a period until the photorefractive effect is reduced exceeds 1 μs. Therefore, the changer can be realized by a simpler construction.

It is preferable that the changer includes a vibrator for vibrating the incident position of the coherent light on the photorefractive crystal; and that a vibration amplitude by the vibrator is 20% or more of the beam diameter of the coherent light incident on the photorefractive crystal and below 40 μm.

In this case, it is possible to reduce speckle noise in a liquid crystal display panel and the like and suppress noise and power consumption increases caused by vibration.

It is preferable that the changer includes a deflection element arranged on the optical path of the coherent light; and that the deflection element includes at least one of an electro-optic element and an acoustooptic element.

In this case, since a small variation by the electro-optic element or the acoustooptic element causes a large and complicated refractive index change in the photorefractive crystal, wherefore the speckle noise can be sufficiently reduced.

It is preferable that the photorefractive crystal includes anti-reflection films for the coherent light on an incident surface on which the coherent light is incident and an opposite surface opposite to the incident surface; and that surfaces of the photorefractive crystal other than the incident surface and the opposite surface reflect the coherent light.

In this case, light utilization efficiency of laser light can be improved and an interference effect in the photorefractive crystal increases to increase a refractive index change by the reflection of the laser light in the crystal. Therefore, a larger speckle noise reducing effect can be obtained.

The changer preferably changes at least one of the light intensity distribution, polarization direction, wavelength and intensity of the coherent light in a cycle of 30 Hz or higher.

In this case, the speckle noise can be reduced to such a degree that human eyes cannot be respond.

It is preferable that the coherent light source includes a plurality of coherent light sources for emitting a plurality of coherent light having different wavelengths, and that the plurality of coherent light sources cause the plurality of coherent light to be incident on the photorefractive crystal, thereby temporally changing the interference pattern of the coherent light on the surface of the illumination object at a higher speed as compared with the case where the respective plurality of coherent light are independently incident.

In this case, the plurality of coherent light overlap in one photorefractive crystal and different refractive index distributions are generated in the photorefractive crystal for the plurality of coherent light having the different wavelengths. Thus, it is possible to constantly induce the refractive index change of the photorefractive crystal and continuously reduce the speckle noise.

A variation width of the intensity of the coherent light emitted from at least one of the plurality of coherent light sources is preferably 10% or more of an average intensity of this coherent light.

In this case, it is possible to increase the photorefractive effect and reduce speckle noise of a projector-type image display device in which it is difficult to reduce the speckle noise.

The coherent light emitted from a first one of the plurality of coherent light sources and that emitted from a second coherent light source different from the first coherent light source differ in at least one of the light intensity distribution, the polarization direction and the intensity.

In this case, it is possible to increase the photorefractive effect and reduce speckle noise of a projector-type image display device in which it is difficult to reduce the speckle noise.

The wavelength of the coherent light having a longest wavelength out of the plurality of coherent light emitted from the plurality of coherent light sources is preferably 1.14 times as long as or longer than the wavelength of the coherent light having a shortest wavelength.

In this case, a large speckle noise reducing effect can be obtained.

The photorefractive crystal preferably includes a crystal which exhibits a thermal lens effect as well as the photorefractive effect.

In this case, the speckle noise can be sufficiently reduced since the refractive index in the crystal largely changes due to the photorefractive effect and the thermal lens effect.

Another light source device according to the present invention is for illuminating an illumination object with coherent light and comprises a coherent light source for emitting the coherent light; and a pattern changer for changing an interference pattern of the coherent light on a surface of the illumination object, wherein the pattern changer includes a thermal lens crystal which is arranged between the coherent light source and the illumination object and on an optical path of the coherent light and exhibits a thermal lens effect and a changer for changing at least one of a light intensity distribution, a polarization direction, a wavelength and an intensity of coherent light incident on the thermal lens crystal.

In this light source device, since at least one of the light intensity distribution, polarization direction, wavelength and intensity of the coherent light incident on the thermal lens crystal is changed, a temperature distribution in the thermal lens crystal and a refractive index distribution caused thereby change. As a result, noise and power consumption can be low and speckle noise can be continuously reduced by temporally changing the interference pattern on an irradiated surface.

A lighting device according to the present invention comprises the above light source device; and an optical system for introducing light from the light source device.

In this lighting device, noise and power consumption can be low and speckle noise can be continuously reduced by temporally changing an interference pattern on an irradiated surface.

An image display device according to the present invention comprises the above light source device; a spatial modulation element; and an optical system for introducing light emitted from the light source device to the spatial modulation element.

In this image display device, noise and power consumption can be low and speckle noise can be continuously reduced by temporally changing an interference pattern on an irradiated surface.

Another image display device according to the present invention comprises a light source device for emitting coherent light, a screen member to be irradiated with coherent light from the light source device and including a photorefractive crystal which exhibits a photorefractive effect, wherein the light source device changes at least one of a light intensity distribution and a polarization direction of the coherent light irradiating the screen member.

In this image display device, noise and power consumption can be low, speckle noise can be continuously reduced by temporally changing interference patterns formed on the retinas of an observer, and a viewing angle of the image display device can also be widened.

Industrial Applicability

According to the present invention, noise and power consumption can be low and speckle noise can be reduced by temporally changing an interference pattern on an irradiated surface. Therefore, the present invention is highly useful to light source devices, lighting devices, image display devices and the like utilizing coherent light such as laser light.

What is claimed is:

1. A light source device for illuminating an illumination object with coherent light, comprising:
   a single coherent light source for emitting single coherent light; and
   a pattern changer configured to change an interference pattern of the single coherent light on a surface of the illumination object and reduce speckle noise of the single coherent light,
   wherein the pattern changer includes:
      a thermal lens crystal which is arranged between the single coherent light source and the illumination object and on an optical path of the single coherent light and exhibits a thermal lens effect for the single coherent light emitted from the single coherent light source, and
      a changer configured to change at least one of a light intensity distribution, a polarization direction, a wavelength and an intensity of the single coherent light incident on the thermal lens crystal in a time period shorter than a period required for the temperature distribution of the thermal lens crystal to stabilize, and
   wherein a side surface of the thermal lens crystal totally reflects the single coherent light.

2. A lighting device, comprising:
   a light source device according to claim 1; and
   an optical system for introducing light from the light source device to the illumination object.

3. A image display device, comprising:
   a light source device according to claim 1;
   a spatial modulation element; and
   an optical system for introducing light emitted from the light source device to the spatial modulation element.

* * * * *